(12) United States Patent
Li et al.

(10) Patent No.: US 8,874,046 B2
(45) Date of Patent: Oct. 28, 2014

(54) TECHNIQUES UTILIZING STEP SIZE ADAPTATION FOR DIFFERENTIAL BEAMFORMING IN WIRELESS NETWORKS

(75) Inventors: Qinghua Li, San Ramon, CA (US); Xintian E. Lin, Palo Alto, CA (US); Yuan Zhu, Beijing (CN); Jiacheng Wang, Beijing (CN); Shanshan Zheng, Beijing (CN); Xiaofeng Liu, Beijing (CN); Guangjie Li, Beijing (CN); Feng Zhou, Beijing (CN)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 12/655,258

(22) Filed: Dec. 28, 2009

(65) Prior Publication Data

US 2011/0158218 A1    Jun. 30, 2011

Related U.S. Application Data

(60) Provisional application No. 61/142,582, filed on Jan. 5, 2009.

(51) Int. Cl.
*H04B 1/00* (2006.01)
*H04B 7/06* (2006.01)

(52) U.S. Cl.
CPC ............ *H04B 7/0641* (2013.01); *H04B 7/0617* (2013.01); *H04B 7/0639* (2013.01)
USPC ............. 455/69; 455/68; 455/63.1; 455/63.3; 370/342; 370/344

(58) Field of Classification Search
USPC ............. 370/344, 342; 455/69, 68, 63.1, 63.3
See application file for complete search history.

(56) References Cited

U.S. PATENT DOCUMENTS

| | | | |
|---|---|---|---|
| 2007/0195974 A1* | 8/2007 | Li et al. | 381/94.3 |
| 2008/0049709 A1* | 2/2008 | Pan et al. | 370/344 |
| 2008/0232503 A1* | 9/2008 | Kim | 375/267 |
| 2010/0202549 A1* | 8/2010 | Lin et al. | 375/260 |
| 2011/0064158 A1* | 3/2011 | Li et al. | 375/267 |
| 2011/0075650 A1* | 3/2011 | Zhu et al. | 370/344 |
| 2011/0211656 A1* | 9/2011 | Kent et al. | 375/296 |

FOREIGN PATENT DOCUMENTS

| | | |
|---|---|---|
| WO | 2007092539 A2 | 8/2007 |
| WO | 2008/116181 A2 | 9/2008 |
| WO | 2010/078568 A1 | 7/2010 |

OTHER PUBLICATIONS

V. Raghavan, R. W. Heath, Jr., and A. M. Sayeed, "Systematic codebook designs for quantized beamforming in correlated MIMO channels," IEEE J. Select. Areas Commun., vol. 25, No. 7, pp. 1298-1310, Sep. 2007.*
T. Abe and G. Bauch, "Differential codebook MIMO precoding technique," in Proc. IEEE Globecom'07, Nov. 2007.*

(Continued)

*Primary Examiner* — Nay A Maung
*Assistant Examiner* — Erica Fleming-Hall
(74) *Attorney, Agent, or Firm* — Thorpe North & Western LLP

(57) ABSTRACT

An embodiment of the present invention provides a method used in transmit beam forming, comprising, providing differential feedback by using variable differential codebooks across a plurality of feedbacks wherein the differential codebooks may have different shapes, and/or spans, and/or the numbers of codewords across feedbacks.

15 Claims, 2 Drawing Sheets

(56) References Cited

OTHER PUBLICATIONS

International Search Report/Written Opinion for Patent Application No. PCT/US2010/020087, mailed Jun. 4, 2010, 10 pages.
Chinese Office Action for Application No. 2011-544651, mailed Oct. 23, 2012, four pages.
Abe et al., "Differential Codebook MIMO Precoding Technique," Proc. IEEE Globecom 2007, Nov. 26, 2007, six pages.
Raghavan, V, et al., "Systematic Codebook Designs for Quantized Beamforming in Correlated MIMO Channels," IEEE Journal on Selected Areas in Communications, vol. 25, No. 7, Sep. 30, 2007, thirteen pages.
International Preliminary Report on Patentability received for PCT application No. PCT/US2010/020087, mailed on Jul. 14, 2011, 5 pages.
Office Action received for Korean Patent Application 10-2011-7017556, mailed on Feb. 25, 2013, 7 pages of Office Action including 3 pages of English translation.
Office Action received for Korean Patent Application 10-2011-7017556, mailed on Aug. 20, 2012, 7 pages of Office Action including 3 pages of English translation.
Office Action received for Chinese Patent Application No. 201080004247.0, mailed on Jun. 13, 2013, 13 pages of Office Action Including 8 page of English Translation.

* cited by examiner

TECHNIQUES UTILIZING STEP SIZE ADAPTATION FOR DIFFERENTIAL BEAMFORMING IN WIRELESS NETWORKS

CROSS-REFERENCE TO RELATED APPLICATIONS

The present application claims the benefit of U.S. provisional application Ser. No. 61/142,582, filed Jan. 5, 2009, entitled "ADVANCED WIRELESS COMMUNICATION SYSTEMS AND TECHNIQUES" the entire content of which is incorporated by reference herein.

BACKGROUND

Transmit beamforming, which may improve wireless communications, requires the feedback of beamforming matrixes in a frequency division duplexing (FDD) mode. The feedback can be differential with respect to the previous feedback. Differential feedback exploits the correlation between the ideal beamforming matrixes across time in order to reduce feedback overhead and increase beamforming accuracy. A quantization codebook may be used to quantize the differential matrix for the feedback. Previously, quantization codebook is constant across time. This is not optimal.

Thus, a strong need exists for improvements in providing differential feedback used in transmit beamforming.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
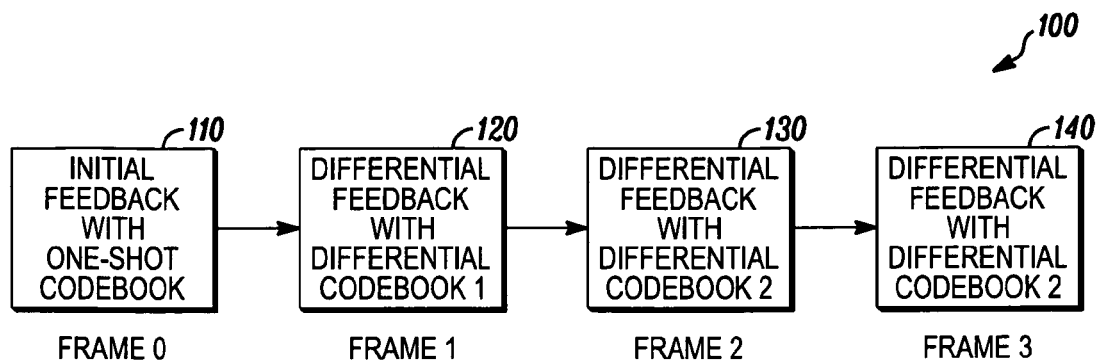
FIG. 1 depicts differential codebook variation across feedbacks.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

As mentioned above, in the prior art of differential feedback, a constant differential codebook is used across feedbacks. For the example as shown as 100 of FIG. 1 the feedback starts at 110 with an initial feedback for frame 0, which uses a non-differential codebook. For frame 1 120, the differential matrix with respect to the beamforming matrix of frame 0 110 is computed and quantized by a differential codebook, i.e. differential codebook 1. Thus, previously the same differential codebook is used for the subsequent frames as seen by frame 2 130 and frame 3 140.

Figure 2:
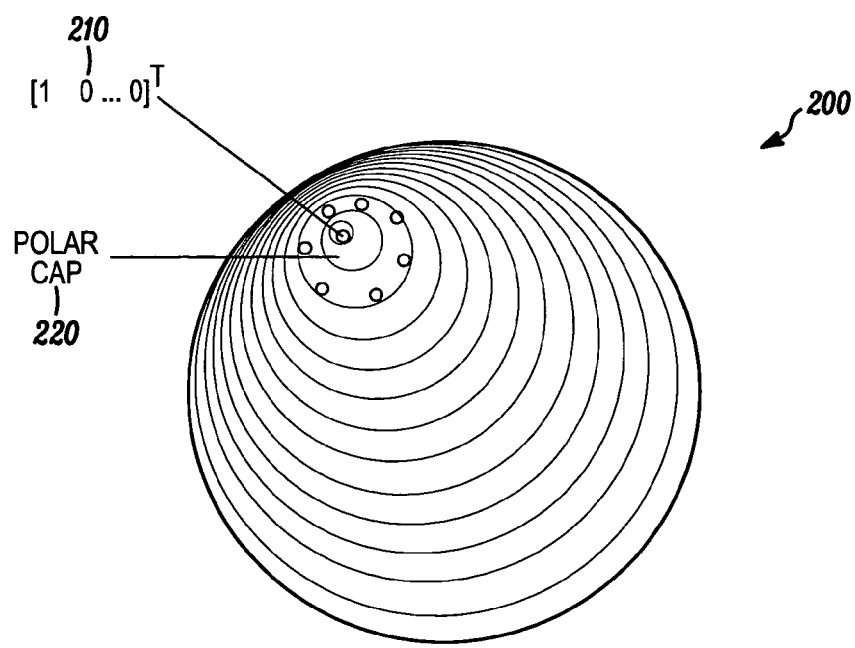
FIG. 2 depicts full quantization space and polar cap according to embodiments of the present invention.

However, this is not optimal. Embodiments of the present invention provide varying the differential codebook across a plurality of feedbacks. In practice, it is desirable to use the same number of feedback bits across frames. For the same number of bits, the initial feedback has an error greater than the latter differential feedbacks, because the initial feedback can not exploit any correlation (in time or frequency). To compensate for the large error, the differential codebook for frame 1 120 should have a span greater than the differential codebook for the latter frames, i.e. frame 2 and 3. The span can be quantified by polar cap size in angle for a given codebook. As illustrated generally as 200 of FIG. 2, the greater the size of the ring, the greater the polar cap 220 size is. For example, for frame 1 120, the polar cap 220 size may be 30 degrees and it reduces to 20 degrees for frame 2 130, and then remains at 20 degrees for frame 3 140, where the angle is measured between the center codeword and the edge codeword. The differential codebook may have a shape other than a ring with a center 220. In general, the differential codebook may vary its shape, and/or span, and/or the number of codewords across feedbacks.

Figure 3:
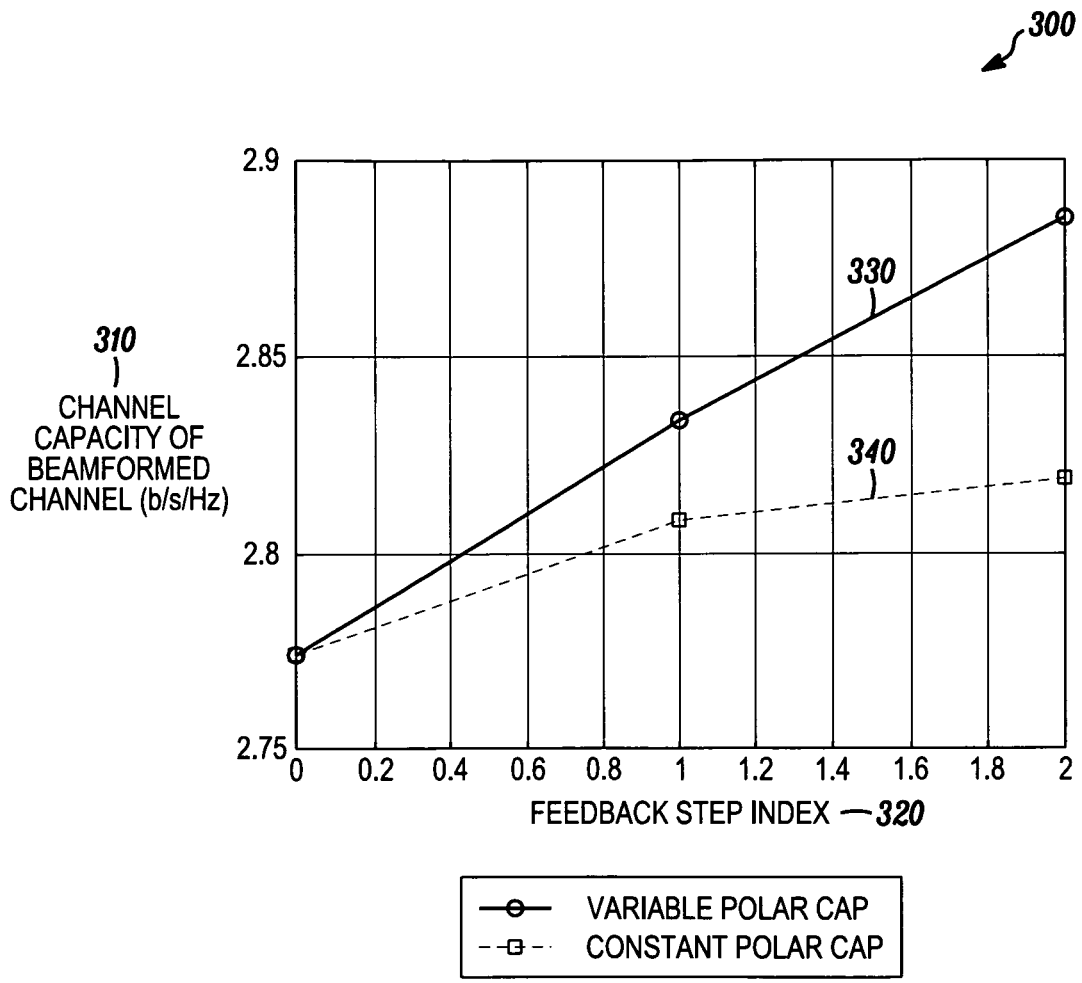
FIG. 3 shows channel capacity increases as differential feedback goes for constant and variable differential codebooks, respectively, according to embodiments of the present invention.

Looking now at 300 of FIG. 3, it is seen that channel capacity 310 increases as differential feedback 320 goes for constant and variable differential codebooks, respectively. FIG. 3 shows simulation results for variable 330 and constant 340 polar caps, respectively. Although not limited in this respect, embodiments of the present invention show in FIG. 3 a simulated MIMO configuration with 4 transmit and 2 receive antennas sending 1 spatial stream. The channel model exemplified is eITU with 3 km/h mobile speed. The transmit antenna spacing is half wavelength, which is desirable for multi-user MIMO. The channel capacity increases as the differential feedback goes. The capacity of a variable polar cap increases faster than that of a constant polar cap, and 1-3% performance gain can be achieved by using variable polar cap. For the variable polar cap, the polar cap sizes are 20, 15, and 5 degrees for the first, second, and third differential feedbacks, respectively, although the present invention is not limited in this respect. In contrast, for the constant polar cap, the polar cap size is always 5 degrees, where the 5 degree is the optimal cap size for the stead state of the differential feedback in this MIMO channel.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method used in transmit beam forming, comprising:
providing differential feedback by using variable differential codebooks across a plurality of feedbacks, wherein said differential codebooks includes a variable polar cap with different polar cap sizes that can be rotated through different angles and said differential codebooks may have different shapes, and/or spans, and/or the numbers of codewords across feedbacks.

2. The method of claim 1, wherein to use the same number of feedback bits across frames, said differential codebook for a first frame has a span greater than a differential codebook for latter frames.

3. The method of claim 1, wherein said span is quantified by a polar cap size in angle for a given codebook.

4. The method of claim 3, wherein said polar cap size is ring shaped and the greater the size of said ring, the greater the polar cap size.

5. The method of claim 4, wherein said differential codebook may also have a shape other than a ring with a center or without a center and wherein said differential codebook may vary its shape, and/or span, and/or the number of codewords across feedbacks.

6. An apparatus, comprising:
a transceiver adapted for communication in a wireless network, said transceiver further adapted to use transmit beam forming; and
wherein said beam forming uses differential feedback by using variable differential codebooks across a plurality of feedbacks wherein said differential codebooks includes a variable polar cap with different polar cap sizes that can be rotated through different angles and said differential codebooks may have different shapes, and/or spans, and/or the numbers of codewords across feedbacks.

7. The apparatus of claim 6, wherein to use the same number of feedback bits across frames, said differential codebook for a first frame has a span greater than a differential codebook for latter frames.

8. The apparatus of claim 7, wherein said span is quantified by a polar cap size in angle for a given codebook.

9. The apparatus of claim 8, wherein said polar cap size is ring shaped and the greater the size of said ring, the greater the polar cap size.

10. The apparatus of claim 9, wherein said differential codebook may also have a shape other than a ring with a center or without a center and wherein said differential codebook may vary its shape, and/or span, and/or the number of codewords across feedbacks.

11. A non-transitory computer readable medium encoded with computer executable instructions, which when accessed, cause a machine to perform operations comprising:
providing differential feedback when using transmit beam forming by using variable differential codebooks across a plurality of feedbacks wherein said differential codebooks includes a variable polar cap with different polar cap sizes that can be rotated through different angles and said differential codebooks may have different shapes, and/or spans, and/or the numbers of codewords across feedbacks.

12. The non-transitory computer readable medium encoded with computer executable instructions of claim 11, wherein to use the same number of feedback bits across frames, said differential codebook for a first frame has a span greater than a differential codebook for latter frames.

13. The non-transitory computer readable medium encoded with computer executable instructions of claim 12, wherein said span is quantified by a polar cap size in angle for a given codebook.

14. The non-transitory computer readable medium encoded with computer executable instructions of claim 13, wherein said polar cap size is ring shaped and the greater the size of said ring, the greater the polar cap size.

15. The non-transitory computer readable medium encoded with computer executable instructions of claim 14, wherein said differential codebook may also have a shape other than a ring with a center and wherein said differential codebook may vary its shape, and/or span, and/or the number of codewords across feedbacks.

* * * * *